Oct. 19, 1937. H. J. L. FRANK ET AL 2,096,579
ELECTRICAL DISTRIBUTION TROLLEY DUCT
Original Filed Feb. 23, 1935

Patented Oct. 19, 1937

2,096,579

UNITED STATES PATENT OFFICE 2,096,579

ELECTRICAL DISTRIBUTION TROLLEY DUCT

Harrison J. L. Frank and William A. Harper, Detroit, Mich.

Original application February 23, 1935, Serial No. 7,870, now Patent No. 2,061,515, dated November 17, 1936. Divided and this application August 27, 1936, Serial No. 98,195

8 Claims. (Cl. 247—3)

This application relates to electrical distribution trolley ducts, and is a division of a prior application, Serial No. 7,870 filed February 23, 1935 by Harrison J. L. Frank, William A. Harper, and Joseph A. Messing.

Figure 1:
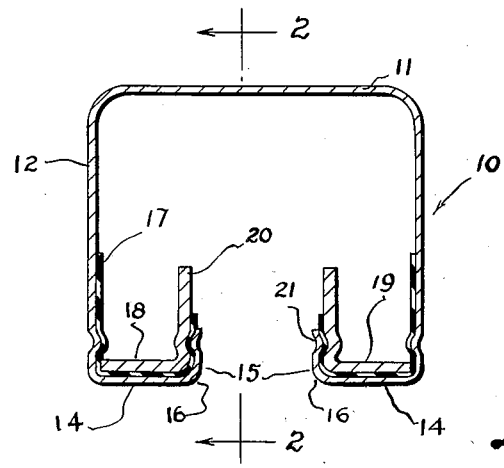
Figure 2:
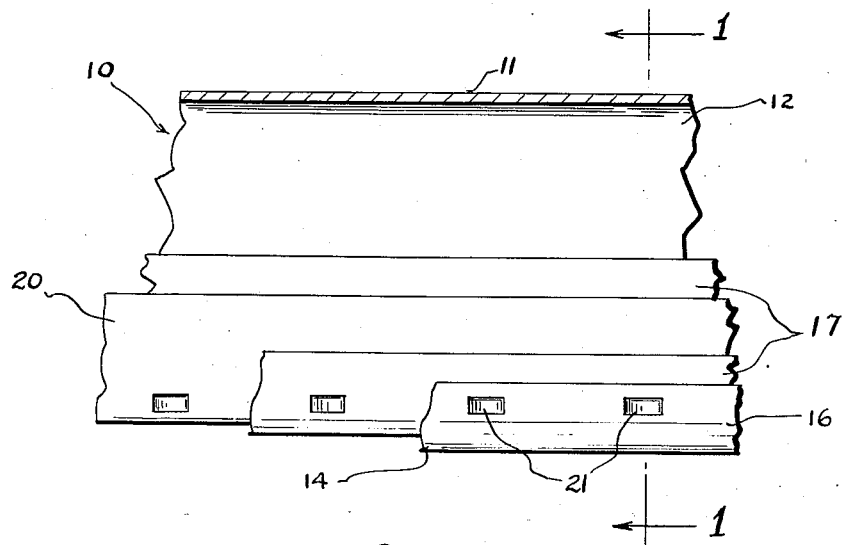

The details of construction of the duct here shown may well be understood upon reference to the following detailed descriptive matter relating to the appended drawing. Referring to this drawing, it will be seen that Fig. 1 shows a duct of the invention in transverse section;

Fig. 2 is a cutaway view as if on section line 2—2, Fig. 1.

Before undertaking a detailed description of the parts of the duct here shown, it will be pointed out that a trolley duct is in the nature of a sheet metal duct of rectangular cross section and having a wall provided with an elongated slot through which may be inserted the blade part of a trolley and in which rides the part of the trolley that depends from the blade, and in which also rides the cross bar of the trolley. On opposite sides of the slot there are positioned bus bars and these form tracks along which ride trolley contacts. In most commercial installations the duct is so positioned that the slotted wall of the duct is horizontally disposed to form the bottom wall and therefore the trolley may be seen to hang down or depend from the duct with its blade within the duct, and with its depending portion riding within the duct slot along the duct.

In the construction shown, the duct comprises a sheet metal casing 10 having a top wall 11, connecting the two side walls 12 and opposite the bottom wall whose portions 14 are separated by a slot 15 defined by the flanged edges 16 of the portions 14. The duct, or at least the portion thereof next adjacent the slotted wall, is lined with insulation 17 and the portions 14 of the slotted wall mount bus bars 18—19 of angular cross section, these having free edges 20 adapted to be received within U-shaped contacts of a trolley. The bus bars may be held in the duct by spaced beads or tongues 21 cut in from the duct and crimping the insulation and the bus bars correspondingly Now having described the electrical distribution duct shown in the appended drawing, reference will be had to the claims which follow for a determination of the protection sought in this application.

We claim:

1. A trolley duct having a vertical wall and a horizontal wall provided with a continuous elongated riding slot bounded by a vertical flange bent transversely from the horizontal wall into the duct, and a bus bar rail between the flange and the adjacent vertical wall and having a horizontal portion adjacent the horizontal wall of the duct and a vertical portion adjacent the flange, the vertical portion of the rail extending into the duct beyond the flange to provide on the rail exposed vertical surfaces.

2. A trolley duct having a vertical wall and a horizontal wall provided with a continuous elongated riding slot bounded by a vertical flange bent transversely from the horizontal wall into the duct, and a bus bar rail between the flange and the adjacent vertical wall and having a horizontal portion adjacent the horizontal wall of the duct and a vertical portion adjacent the flange, the vertical portion of the rail extending into the duct beyond the flange to provide on the rail exposed vertical surfaces, the horizontal portion of the rail extending from the flange to the adjacent vertical wall of the duct so as to be restrained from lateral shifting with respect to the duct by the duct parts.

3. In a bus duct, a sheet metal duct, a bus bar, and means for securing the bus bar and the duct relatively comprising longitudinally spaced struck in and uncut depressions in the bus bar and complementary longitudinally spaced struck in and uncut depressions in the duct.

4. A trolley duct having adjacent walls meeting in a dihedral angle, one of the walls having a continuous elongated riding slot bounded by a flange bent transversely from the slotted wall into the duct, and a bus bar rail of angular cross section disposed between the flange and the other wall and having a portion adjacent the slotted wall and a portion adjacent the flange and extending into the duct beyond the flange to provide on the rail exposed surfaces and an exposed edge.

5. A trolley duct having adjacent walls meeting in a dihedral angle, one of the walls having a continuous elongated riding slot bounded by flanges bent transversely from the slotted wall into the duct, and bus bar rails of angular cross section between the flanges and the other walls and having portions adjacent the slotted wall and portions adjacent the flanges and extending into the duct beyond the flanges to provide on the rails exposed surfaces and exposed edges.

6. A trolley duct having adjacent walls meeting in a dihedral angle, one of the walls having a continuous elongated riding slot bounded by a flange bent transversely from the slotted wall into the duct, and a bus bar rail of angular cross section disposed between the flange and the other wall and having a portion adjacent the slotted wall and extending from the flange to the other wall so as to be restrained from lateral shifting and a portion adjacent the flange and extending into the duct beyond the flange to provide on the rail exposed surfaces and an exposed edge.

7. A trolley duct having adjacent walls meeting in a dihedral angle, one of the walls having a continuous elongated riding slot bounded by flanges bent transversely from the slotted wall into the duct, and bus bar rails of angular cross section between the flanges and the other walls and having portions adjacent the slotted wall and extending from the flanges to the other walls so as to be restrained from lateral shifting and portions adjacent the flanges and extending into the duct beyond the flanges to provide on the rails exposed surfaces and exposed edges.

8. In a slotted tube bus duct, a sheet metal slotted tube duct, a bus bar disposed against one portion thereof and between two parallel portions thereof connecting which and between which is the first named duct portion, the parallel portions having a plurality of longitudinally spaced, inwardly struck, individual elements which are directed towards each other and cooperate with one another and with the bus bar to interlock the latter in the duct and against the first named portion of the duct.

HARRISON J. L. FRANK.
WILLIAM A. HARPER.